INVENTOR
Stuart McCullough
BY George Knowles
ATTORNEY

June 12, 1962 S. McCULLOUGH 3,039,031
POSITION CONTROL SERVOSYSTEM AND THE LIKE
Filed April 16, 1959 3 Sheets-Sheet 2

INVENTOR.
STUART McCULLOUGH
BY

INVENTOR
Stuart McCullough
BY George Knowles
ATTORNEY

United States Patent Office 3,039,031
Patented June 12, 1962

3,039,031
POSITION CONTROL SERVOSYSTEM AND THE LIKE
Stuart McCullough, 18098 Karen Drive, Encino, Calif.
Filed Apr. 16, 1959, Ser. No. 806,970
16 Claims. (Cl. 318—29)

This invention relates to automatic control systems and components thereof for use in electrically controlled positioning mechanisms and devices of similar character. The invention is particularly concerned with the energization and control of electric motors used in positioning servos, and is particularly applicable to on-off type control of such motors. The broad objective of the invention is to provide a remotely controlled positioning device capable of accurately positioning some instrumentality by means of an electrically controlled actuator.

One of the problems encountered in utilizing electric motors in on-off controlled positioning applications stems from the inertia of the moving parts and resulting tendency to continue moving after being disconnected from the source of power. It is therefore an object of the invention to provide a control system that minimizes overshooting and hunting.

In order to obtain this objective, it is desirable to be able to connect the electric motor to a source of power such that it may be caused to run in either direction as desired, to disconnect it to permit it to coast, or to connect it for dynamic braking. These switching functions should operate in proper sequence in response to a signal from the sensory element. Accordingly it is a further object of this invention to provide a servo relay which is adapted to control a shunt motor in response to a suitable signal and to provide as a function of said signal, forward energization, reverse energization, coasting, and dynamic braking.

In order to simplify the problem of minimizing overshooting, it may be desirable to modify the usual characteristics of the shunt motor. Such motors as are most desirable for servo use, have the characteristic that they accelerate quickly when energized and coast freely when disconnected. However, if the primary concern is accurate positioning when the motor is at rest rather than a high order of accuracy when the motor is accelerating to follow a changing balance point, this characteristic is the opposite of that which is desired. A motor that accelerates gently and stops quickly greatly simplifies the problem of correcting small errors without overshooting and hunting, as in such case the periods of energization required to correct small errors will be longer and consequently more easily controlled by a switching device that requires a finite time to operate; also the motor will have attained a lesser speed when the small error is corrected and there will be less kinetic energy to dissipate.

Accordingly, a non-linear resistance is connected in series with energizing circuit for the armature of the shunt motor. This non-linear resistance may take the form of tungsten lamps of suitable rating. The hot resistance of these is several times the cold resistance. When the motor at rest is connected to the source of power, the resistance of the cold lamps is low, and a considerable current is permitted to pass, thus providing ample starting torque. The current heats the lamps, causing their resistance to rise and thus reduce the current through the lamps and armature so that the motor acceleration is reduced. As the motor speed increases, its back E.M.F. increases, the current falls, and the lamps are permitted to cool and reduce their resistance which in turn may facilitate further motor speed increase. Thus the acceleration of the motor may be significantly reduced in such a way that adequate starting torque and running speed are maintained, and dynamic braking may still be applied to decelerate the motor quickly since the inertia of the motor has not been increased.

In on-off positioning servos the problem of overshooting the balance point is increased with increasing sensitivity of the control, since the sensitivity required if motor energization is to be caused by a small error, if present while the motor is running at full speed, can cause the motor to remain energized until the instrumentality being positioned is so close to the balance point that the motor cannot decelerate quickly enough to avoid overshooting. Accordingly the present invention provides for variation in sensitivity by varying the gain of the system directly with the voltage supplied for the motor armature circuit. In the static condition, high voltage and sensitivity are provided, such that small errors result in motor energization, and this occurs with sufficient voltage to provide good starting torque. Energization of the motor through the non-linear resistances results in a drop in voltage supplied for the armature and proportionate reduction in sensitivity.

The control system to be described is intended to be used with A.C. bridge circuits and any other transducer or primary sensing device or element the output of which is substantially proportional to an applied excitation voltage or current and to the error it detects, and which reverses in phase with reversal of the direction of the error. Thus the variation in sensitivity and gain desired may be obtained by varying the excitation for the primary element as a function of a voltage obtained from the motor energizing circuit, it being one of the objects of the invention to provide a progressive decrease in gain of the system as the motor accelerates.

The bridge is therefore energized from the power source through the series-connected non-linear resistance. When the system is static or quiescent and no motor current is drawn, the current through the non-linear resistance will be limited to that drawn by the bridge, and the voltage drop across the cold non-linear resistance will be negligible. Maximum voltage is thus applied to the bridge circuit, and maximum sensitivity results. Energizing of the motor armature, with its current passing through the non-linear resistance results in an immediate voltage drop across the resistance and corresponding decrease in excitation voltage and gain. Progressive heating of the non-linear resistance, accompanied by substantial increase in its resistance, progressively increases the voltage drop across it and results in further corresponding decrease in bridge excitation voltage and gain during the first portion of the acceleration transient. Subsequently the non-linear resistance cools down, it experiences less voltage drop across it due to the decreased current and resistance, and the gain is partially restored. Deenergization of the motor stops the motor current through the non-linear resistance and the voltage drop across it once more becomes negligible, restoring gain to the maximum value.

Since energization of the motor is accomplished by the relay in response to the error signal, and this error signal is proportional to the product of physical error and gain, it follows that as the gain decreases a correspondingly larger physical error is required to cause (or maintain) motor energization. Thus when the gain is decreasing, the magnitude of error required to maintain motor energization is increasing. This is the condition encountered during the first portion of the motor acceleration transient, such that for small errors only a moderate gain decrease is necessary in order to cause deenergizing the motor, and this is effected after a brief period of energization in which the motor accelerates a limited amount. Larger errors require longer periods of energization, accompanied by greater motor acceleration and gain reduction before deenergization occurs. In the case of errors of such magnitude as to cause the system to maintain motor energization despite minimum gain, the motor will run until the physical error is thereby reduced enough to reduce the error signal and permit deenergization, which will in any case occur before the balance point is reached because of the gain reduction persisting to some considerable extent while the motor is running.

When the system is very near its balanced condition, dynamic braking is effected. In the event the motor stops short of the desired position or should an overshoot occur, the restored high sensitivity of the system causes reenergizing of the motor to accomplish the necessary adjustment.

If the control system described is used to follow a continuously changing balance point, the motor may be permitted to run continuously with moderate speed variations. This is made possible by the use of a relay which can brake the motor, permit it to coast, or energize it through the nonlinear resistance. Closing the circuit through the warm lamps limits the current that is drawn by the motor and consequently prevents high acceleration. The availability of a coast position permits the motor to decelerate gently. Dynamic braking eliminates the need to apply reverse energization to the motor in order to stop it quickly. Thus high accelerations of the motor may be avoided when so operating. The variable gain feature operates simultaneously to effect high sensitivity when the motor is not energized and reduced sensitivity when energized.

This application is a continuation-in-part of my prior application, Serial No. 360,724, filed June 10, 1953, now abandoned.

Other objects and advantages of the invention pertain to the general improvement and simplification of control systems of the character mentioned, and to certain novel constructions, combinations, and interactions of parts and components set forth in the following description of the invention. This description is made with reference to the accompanying drawings, which form part of the specification.

Referring to the drawings.

Figure 1:
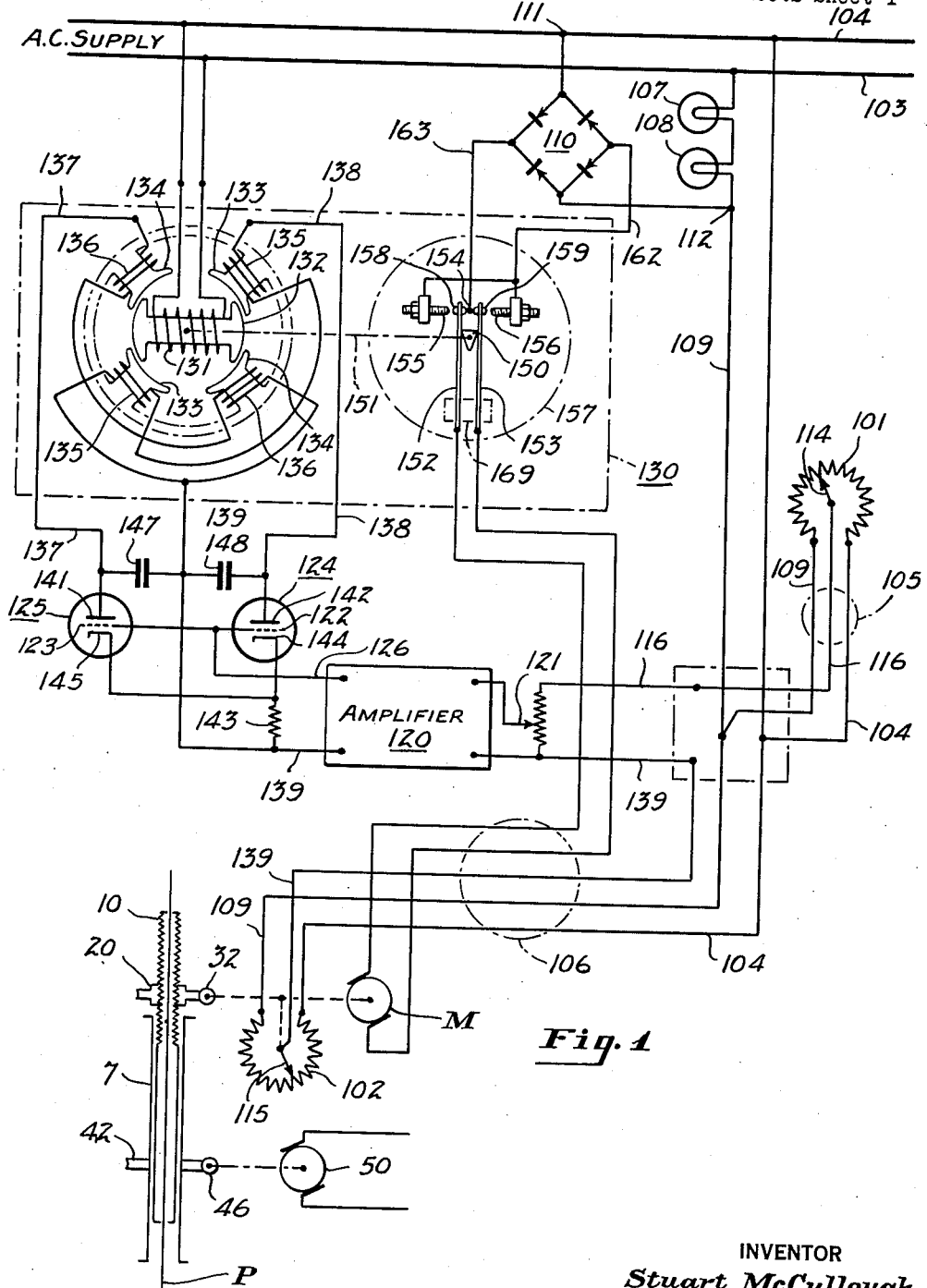
FIGURE 1 is a diagram of the present invention as applied to a probe actuating device.

The broader aspects of the control system can best be explained with reference to the simplified diagram of FIG. 1. In this diagram it is understood that a motor M of the actuator is connected by suitable means such as gearing, to a load the position of which is to be controlled. The load by way of example is a probe P that may be projected or retracted by motor rotation in a corresponding direction. The connection between the motor M and the probe P is shown diagrammatically by a dotted line representing a mechanical linkage connecting motor M to a worm 32, which in turn engages worm gear teeth on the periphery of a nut 20. The nut engages threads of a carrier tube 10 for the probe. Rotation of the nut causes extension and retraction of the carrier tube which is restrained from moving angularly. The probe may also be angularly positioned by turning a sleeve 7 keyed to the tube, the motor M and associated gearing being supported on the sleeve 7 so that this movement of the sleeve does not affect the longitudinal adjustment. A motor 50 turning worm 46 by means of suitable gearing effects rotation of a worm gear 42 which is attached to sleeve 7. This function is independent of the described invention but may be effected by a control such as will be described for extension and retraction. Since the invention may be used with a variety of actuator structures further details are omitted as unnecessary.

The primary or error sensing element here consists of a resistance bridge comprising potentiometers 101 and 102. The potentiometer 102 has a slider 115 the position of which follows that of the probe P whereby an electrical indication of the position of the probe P is obtained. For this purpose, a linkage is also provided between the motor M and the slider 115, as indicated in dotted lines. This structure is supported with the motor M. The input or master potentiometer 101 may be located in any convenient place, and its slider 114 positioned manually or by some other device. The potentiometer connections may be conveniently included in cables 105 and 106, the bridge being connected to its source of excitation by leads 104 and 109. A.C. power is supplied as indicated by leads 103 and 104. Bridge excitation current flows through lamps 107 and 108, which act as a suitable non-linear resistance.

The output of the potentiometer bridge appears across sliders 114 and 115, which are connected by leads 116 and 139 to a suitable voltage amplifier 120 of conventional design. Manual adjustment of gain may be made by potentiometer 121 inserted in the circuit. The bridge output is an A.C. signal that represents the difference in position of sliders 114 and 115. The direction in which slider 115 must be moved to restore balance is indicated by the phase of this signal, which inverts when the direction of the error reverses.

D.C. power for the motor is obtained by connecting full wave rectifier 110 at 111 and 112, such that the current drawn from the supply passes through lamps 107 and 108. The voltage applied to the rectifier for energizing the motor is thus the same as the voltage used to excite the potentiometer bridge.

Figure 2:
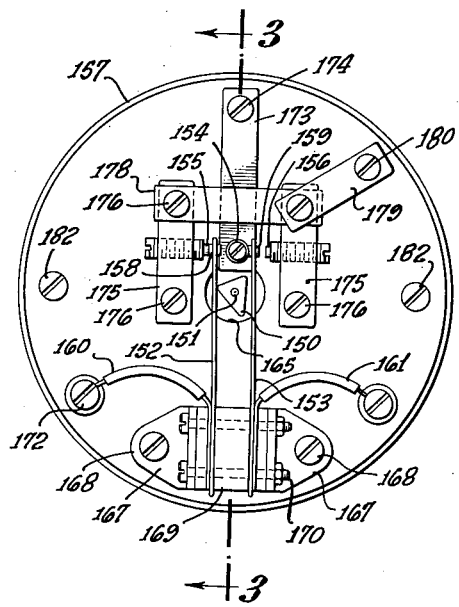
FIG. 2 is an orthographic view of the top of the servo relay of FIGURE 1 showing the contact structure.
Figure 3:
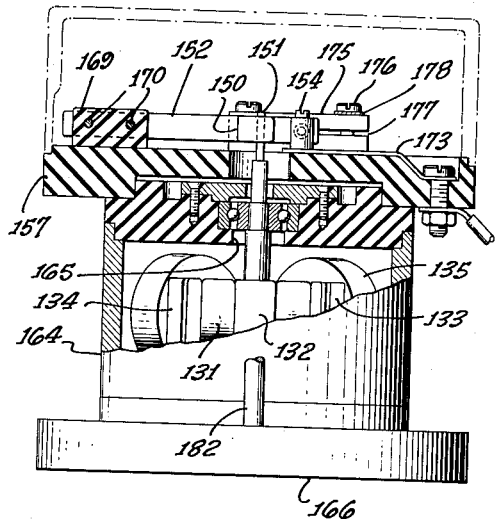
FIG. 3 is a sectional detail, with parts removed and cut away, through the top of the servo relay, this view being taken substantially along line 3—3 of FIG. 5.

Connection of the motor M to the source of power in response to the error signal is accomplished by the servo relay indicated diagrammatically by the box 130 in FIG. 1 and shown in greater detail in FIGS. 2 and 3. The relay comprises an electromagnetic structure that produces a torque on shaft 151 as a function of the error signal, a contact assembly that accomplishes the switching in the motor circuit as a result of this torque, and the associated structure. The operation of the relay will first be discussed briefly with reference to FIG. 1 in order to impart a concept of the operation of the control system of which it is a part. Details of its structure and operation will be discussed later.

The magnetic circuit of the relay comprises a laminated iron rotor and stator and an air gap separating them. A flux is established in it by a current in a coil 131 wound on rotor 132, which may be of the magneto type as depicted in FIG. 1 or may have distributed windings to accomplish the same end. This coil is connected by slip rings and brushes or flexible leads (not shown) to leads 103 and 104 of the A.C. supply. The magnetic flux path is completed by the stator. The stator in this instance has four salient poles, 133, 134, 133, and 134, the same reference character being used for diametrically opposite poles because their operation is cumulative. The stator may be made with either concentrated windings on salient poles as shown or with distributed windings in slots.

The magnetic structure may be identical to that of certain types of synchros. The magnetic flux produced by the roter 132 links coil pairs 135 and 136 associated with the pole pairs 133 and 134. A voltage is accordingly induced in the coils. The coil pairs are connected in series as shown so that the induced voltages add and such that if a suitable load or short circuit is connected across the pair of coils for one pole set 135 or 136, the magnetic flux of the rotor will be displaced so that it will, for the most part, pass through the other pole set 136 or 135. This occurs because the currents, which will flow through the coils and a suitable load impedance as a result of the induced voltage, will tend to create a magnetic force opposing the flux that induced the voltage. Loading one pair of coils more than the other will therefore produce a net displacement of the flux path, such that the flux distribution is no longer symmetrical about the axis of rotor 132 nor equally distributed among all 4 stator poles. The displacement of the flux will produce a net torque on rotor 132, in much the same manner as a torque is produced in synchros. This torque may be conveniently regarded as the force resulting from the flux and the current carrying conductors immersed in it, in the case of distributed stator windings, or the torque may be thought of as simply the tendency of the rotor to align itself with the flux path of the stator in the case of salient stator poles. Either physical concept will be adequate to picture the operation of the system.

The ends of the stator coils 135 and 136 are connected by leads 137 and 138 to plates 141 and 142 of vacuum triodes 125 and 124 and to condensers 147 and 148 which provide a path for A.C. currents. The common center terminal of coils 135 and 136 is connected to the condensers and to the output of the voltage amplifier 120 by lead 139, which may be the ground of the circuit. Indirectly heated cathodes 144 and 145 are also connected to lead 139 through bias resistor 143. The grids 122 and 123 of tubes 124 and 125 are connected to the output of the voltage amplifier 120 by lead 126.

Tubes 124 and 125 are thus supplied with plate voltages of opposite phase, such that their plates are alternately positive, that is, able to conduct current. The grids are supplied with the error signal which reverses phase with reversal of direction of the error. The combination is therefore phase sensitive, favoring the conduction of one tube when the phase of the error signal is such that the grids tend to become positive when its plate is positive and during the next half cycle when the plate of the other tube is positive tending to prevent the conduction of this other tube by a negative signal voltage applied to the grids. In this manner tubes 124 and 125 may be regarded as regulating the relative magnitude of current flowing in coils 135 and 136 in response to the error signal, and in doing so affect the flux distribution in the relay so as to produce a torque on the relay shaft 151 corresponding in direction and magnitude to the error signal causing it.

In order to move the contacts of the relay and perform the actual switching operations in the motor circuit, a triangular toggle or lever 150 is attached to shaft 151 of the relay. Springs 152 and 153 mounting contacts 158 and 159 are secured by an insulator assembly 169 to a supporting plate 157. In the zero-error signal condition the springs 152 and 153 cause contacts 158 and 159 to engage contact 154 simultaneously. Contact 154 is connected by lead 163 to an output terminal of rectifier 110, and contacts 158 and 159 are connected to the armature of motor M, which may have a permanent magnet field. In this condition the motor armature is shorted and dynamic braking is effected. If an error signal should cause a sufficient torque to be applied to toggle 150, it will tend to rotate and in doing so displace contact 158 or 159 out of engagement with contact 154. The phase of the error signal will determine the direction of the torque and which contact is displaced. In this condition the motor armature lead connected to the contact so displaced is open circuited, and the motor is permitted to coast. Should the error signal be of greater magnitude, the displaced contact may be forced into engagement with a fixed contact. Contact 158 may be made to engage contact 155 in this manner, or contact 159 may be made to engage contact 156. Contacts 155 and 156 are connected by lead 162 to the other output terminal of rectifier 110, and when engaged by a movable contact energization of the motor is effected. The engagement of contact 158 with contact 155 while contact 159 engages contact 154 will cause motor rotation in one direction; the engagement of contact 159 with contact 156 while contact 158 engages contact 154 will apply power of opposite polarity to the armature of the shunt motor and cause rotation in the opposite direction.

Thus it is seen that the servo relay is capable of connecting the motor for forward and reverse energization, for dynamic braking, or maintaining it disconnected so that it may coast. This switching action occurs as a function of the applied signal such that for a large signal of one phase, energization in one direction is caused; for a lesser signal, coasting is permitted; for a still smaller signal dynamic braking is applied; for a signal of suitable magnitude and opposite phase, coasting is also permitted; and for a large signal of opposite phase energization in the opposite direction is effected.

Referring to FIGS. 1, 2, and 3, the detailed construction of the relay will now be considered. FIG. 2 shows the contact arrangement with contact 158 displaced to engage contact 155. The entire contact assembly is mounted on the supporting plate 157, which is made of insulating material such as a suitable phenolic laminate. Movable contacts 158 and 159 are mounted on flat metal springs 152 and 153, which are in turn secured between insulating spacers 169 and attached to angle brackets 167 by through bolts 170. Screws 168 attach the angle brackets to the plate 157. Leads 160 and 161 connect the springs 152 and 153 to suitable terminals as 172.

Contact 154 may take the form of a sleeve surrounding a screw that passes through a hole in strip 173 and screws into end plate 157, and is connected by strip 173 to terminal 174. Stationary contacts 155 and 156 are mounted on screws to facilitate their adjustment, these screws engaging internal threads in bars 175 which may be made of brass and secured to the end plate 157 by screws 176. The bars 175 may be slotted as at 177 for clamping the screws that mount contacts 155 and 156 for adjustment. A jumper strip 178 connects bars 175, and strip 179 connects them to terminal 180.

A circular rabbet fit between the plate 157 and a circular top end of relay frame 164 is shown in FIG. 3. The plate 157 forms an end plate for the frame 164. End plate 157 and base 166, which is similarly fitted to the other end of frame 164, are held in place by screws 182 which may be loosened to permit rotation of the contact assembly relative to the magnetic structure for purposes of alignment. The parts are arranged and clearances so adjusted that in the quiescent position shown in FIG. 1 contacts 158 and 159 both bear against contact 154, there being a small clearance between toggle 150 and springs 152 and 153, and contacts 155 and 156 are adjusted so as to be disengaged from contacts 158 and 159 while in this condition.

The operation of the combination of output tubes, condensers, and relay magnetic structure may now be discussed in greater detail. Vacuum tubes such as 124 and 125 pass plate current only when the plate is positive. Thus with no signal on the grids, the plate currents are substantially in phase with the applied plate voltages. These plate voltages, being induced in the secondary coils of the relay, however, are nearly 90° out of phase with the flux inducing them. In order to produce a net torque in the relay it is necessary to have a component of current in the secondary coils in phase with the flux linking them. This may be obtained by the manipulation of coil resistance and leakage reactance in design and the use of condensers across the relay coils.

Considering the plate circuit of one output tube with no A.C. signal applied to the grid, the current flowing through the tube and coil in the relay would approximate half of a sine wave due to the half wave rectification occurring. This current would produce negligible net torque because during the first 90 electrical degrees during which current flowed, the current carrying conductors would be immersed in flux of one direction, which flux would then decrease to zero value as the current reached a maximum, and then build up in the opposite direction as the current fell to zero. The resulting torque would change direction as the flux reversed (the current maintaining its original direction) so there would be no net torque in either direction from this current since the torque impulses sequentially produced would be of approximately equal value and of opposite direction.

Certain things may be done to produce a net torque in spite of this. The most obvious is to apply a signal to the grid of the tube shifted in phase so that the conduction of the tube will be enhanced during one half and reduced during the other half of the half cycle during which the plate of the tube is positive. Another is to so design the relay and circuit that a phase shift occurs within the relay as a secondary coil is loaded. If a major portion of the induced voltage were used to overcome the leakage reactance drop in the secondary coil, for instance, the terminal voltage and coil current could be nearly in phase with the flux.

The circuit action such as may be employed with such a relay as described may occur as follows: The resistance of the primary coil causes the primary current and flux to advance in phase so that the voltage induced in the secondary is somewhat advanced in phase with respect to the line. The secondary current through the condensers is approximately in phase with the flux, leading the induced voltage, such that a condenser current unbalance would produce a net torque. Since the signal voltage is substantially in phase with the line voltage, and therefore lags the plate voltage, a signal favoring conduction of a tube will favor conduction during the later portion of the half cycle of positive plate voltage more than it will during the earlier portion. Thus the application of a signal to a tube in approximate phase with but lagging somewhat behind the plate voltage tends to increase the lagging current and produce a net torque. This current causes the secondary terminal voltage to fall due to resistance and leakage reactance drops, and in doing so the plate voltage lags farther, coming more nearly into phase with signal voltage. The current of the condenser connected in parallel also falls and lags accordingly with the voltage reduction, reducing the torque caused by the associated leading current through the condenser and coil that opposes the torque caused by the current through the tube. There is a much lesser change in phase and magnitude of voltage applied to the condenser in parallel with the other tube, and the current through it, which causes a torque that aids the torque caused by conduction of the tube discussed, substantially continues. Thus an adequate net torque may be produced and the combination kept phase sensitive.

The structure (pole faces, air gap, etc.) is further designed so that the torque is principally a function of the applied signal, and may decrease somewhat as the displacement of the rotor from neutral increases in contrast to conventional relays in which the operating force may increase substantially as iron parts of the magnetic circuit approach one another. The triangular toggle acts as a variable ratio linkage since its effective lever arm changes as it is displaced, and the springs mounting the movable contacts supply a restoring force. The entire combination is so proportioned that there is very little difference between the signal required to cause contact closure to energize the motor and the signal which will permit opening of these contacts. The toggle and contacts may be maintained at rest in any desired position by the application of a corresponding non-fluctuating signal.

The unconventional nature of the relay described provides certain advantages for servo work. It provides for dynamic braking as well as coasting and forward and reverse energization of the motor. The switching action effecting these connections can occur only in proper sequence. The difference in signal causing make and break of a contact is very small for static observations, thereby avoiding a lag. The relay is inherently phase sensitive with the simplest output stage driving it. Its disadvantages, the weight of the structure required to produce a desired contact pressure, and the rotor inertia required for 60 cycle operation to filter the torque impulses occurring during different parts of the cycle, do not impair its suitability for applications when maximum servo motor acceleration is not needed and weight and torsional vibration are not critical.

The dynamic operation of the control system may now be considered. Referring to FIG. 1, an error in the position of slider 115 of potentiometer 102 relative to the setting of slider 114 of potentiometer 101 is manifested as an A.C. signal input to the amplifier 120. The magnitude of this signal is indicative of the magnitude of the error, and its phase indicative of the direction of the error. The amplified error signal is applied to grids 122 and 123. The phase relationship of the error signal to the plate voltages of output tubes 124 and 125 will determine which tube will conduct more and which will conduct less, and thus determine whether the current through coils 136 will exceed the current through coils 135 or vice versa. The resulting current unbalance in the stator coils will tend to displace the stator flux from its quiescent path, thereby producing a torque on rotor 132 which is transmitted by shaft 151 to toggle 150. The resulting angular displacement of the toggle operates the contacts to effect motor energization in such direction that it will rotate so as to tend to correct the error causing this energization.

If no means of stabilization were provided, a servo consisting of the components just described would oscillate about the balance point unless performance were sacrificed by the use of a slow motor or the acceptance of a large static error. Accordingly two stabilizing means are incorporated into the circuit shown: a device to modify motor acceleration and a variable gain device.

Figure 4:
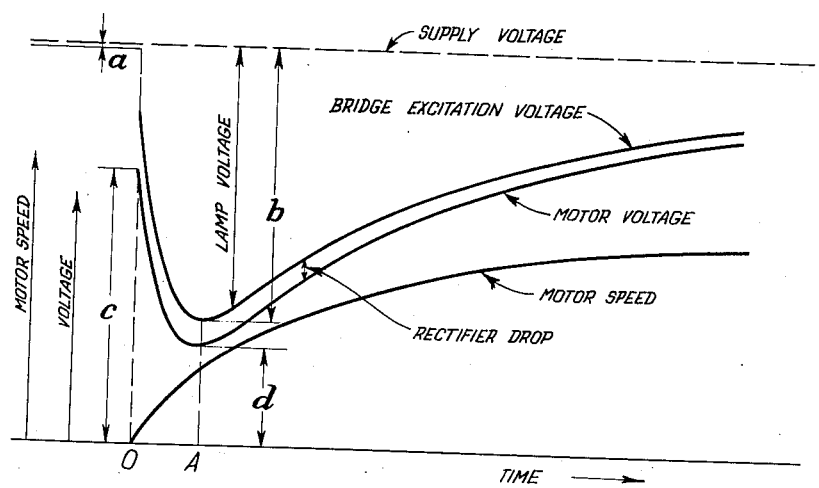
FIG. 4 is a diagram showing certain voltage transients present in the operation of the control system as described.

Dynamic operation of the control system will now be discussed with reference to FIG. 4. This figure shows the starting transient of the control system that results from the sudden appearance of a large error just prior to time O. On the extreme left, the bridge excitation voltage, which is proportional to gain, is shown to be almost equal to the supply voltage, minus only the small voltage drop "a" in cold lamps 107 and 108, their resistance being only a small fraction of the resistance of the bridge. At time O, the instant when one of the movable contacts engages contact 155 or 156 to connect the motor armature to the source of power, the supply voltage is divided between the lamps and the series-parallel circuit consisting of the rectifier elements in series with the motor armature and this combination in parallel with the bridge circuit, minor voltage drops in leads, contact resistance, etc. being neglected.

The resistance of the cold lamps and stationary motor armature is sufficiently low that a substantial current is permitted to flow, and ample motor starting torque is produced. A sudden and discontinuous drop in bridge voltage also occurs at the instant of contact closure because of the increased voltage drop across the lamps.

The current through the lamps causes them to heat rapidly, and a corresponding rise in their resistance occurs. Meanwhile the motor armature is accelerating and developing a back E.M.F. The result is a progressive decrease in armature voltage and gain from time O to time A, when the voltage drop across the lamps attains its maximum value $b$ and the motor armature voltage has decreased from $c$ to $d$. By this time the back E.M.F. of the motor has risen sufficiently to reduce the current drawn through the lamps and permit them to start cooling. As they cool, their resistance falls, the voltage drop across them decreases, and the motor comes up to ultimate speed and the gain is partially restored.

In this manner the acceleration of the motor may be reduced as desired within reasonable limits, while preserving adequate starting torque, reasonable running speed, and the ability to stop quickly by dynamic braking. The non-linear resistance in series with the motor energizing circuit effects an automatic increase and decrease in starting resistance. Motor starting current is determined by the choice of motor supply voltage and cold lamp resistance. Acceleration characteristics are affected by the resistance rise of the lamps, which may be chosen considering the power dissipation per unit mass, specific heat, coefficient of resistance rise due to temperature of the resistance rise due to temperature of the resistance element, and radiating surface of the resistance element.

In the case of small 28 volt motor applications, tungsten lamps such as are used in vehicular applications have been used to advantage as non-linear resistances. An increase of up to about 10 times the cold resistance may be used, the heating time constant being a function of dissipation per unit thermal mass while cooling rate is a function of thermal mass, temperature, and radiating surface, cooling being largely accomplished by radiation in the invention as described. The difference in heating and cooling rates at certain temperatures is significant when the relay is oscillating between energize and coast positions to follow a continuously changing balance point, as it affects the resistance of the lamps at the time of reclosing of the contacts. In any event the maximum resistance attained in normal operation by the lamps or other form of non-linear resistance must be sufficiently low to permit the motor to accelerate on past time A.

The second stabilizing means incorporated in the present invention is the variable gain feature. A number of servos in the prior art provide a means of lowering gain or "increasing the dead zone" to some one desensitized condition while the motor is energized, as a means of stabilizing the system, but unless all error corrective action may be deemed to occur at one rate there is no one value to which gain may be reduced that will provide for minimizing overshoot when correcting large errors with full motor speed and also minimize the number of motor energizations required to correct small errors. When the servo is positioning to a balance point that is not changing, gain should be decreased as motor speed increases. The higher the motor speed, the farther in advance of the balance point the motor should be deenergized if it is to come to rest in the desired position.

Referring again to FIGURE 4, it is seen that a decrease in gain occurs at the instant of contact closure that energizes the motor when starting from rest. A progressive decrease in gain then follows until time A, after which gain, being proportional to bridge excitation voltage, is partially restored to the original static value. It will be apparent that a lesser variation in gain might be obtained by connecting the portion of lead 109 that connects the bridge to its source of excitation in between lamps 107 and 108, for instance, instead of at terminal 112. Either an increase or decrease in variation of gain could be obtained by introducing a suitable transformer into the circuit.

Considering the acceleration transient from time O to time A, with the decrease in gain occurring during this time, it will be evident that the signal which controls the relay is proportional to the product of bridge excitation voltage, and consequently gain and to the physical magnitude of the instantaneous error. Accordingly, in the case of errors barely large enough to cause motor energization, the initial decrease in gain will suffice to reduce the error signal sufficiently to cause deenergization of the motor. If the error is larger, the transient must proceed further, accompanied by greater motor acceleration and gain decrease, before the signal will fall sufficiently to permit motor deenergization. There may be (or may not be in the case of much lag or backlash) a simultaneous reduction of the physical error sensed by the primary error sensing element, in this case an actual movement of slider 115 of potentiometer 102. Thus during this period small errors cause brief periods of motor energization, while larger errors cause correspondingly longer ones. If desired, the action may be thought of as enlarging the "dead zone" as the motor accelerates, so that as its speed increases it will be deenergized farther in advance of the balance point at which it is desired to bring it to rest. The initial sudden decrease in gain at time O compensates approximately for the time required for the relay to operate and effect contact opening after the signal applied to it has fallen just sufficiently to permit it to do so. In this mode of operation a progressive decrease in gain is provided during the first part of the acceleration transient, such that the number of revolutions of the motor shaft are a function of the magnitude of the error causing the motor to be energized, this action being in supplement to any effect of reduction of physical error at the input to the sensing element as a result of the operation of the motor. This action permits the stabilization of a variety of systems containing lags, including backlash, motor inertia, and others. Systems involving pneumatic elements such as restrictions, cavities, and pressure pickups may be stabilized thereby, for instance.

As the acceleration proceeds past time A, the bridge excitation voltage and gain are partially restored. If the system is so proportioned that errors are for the most part corrected without overshoot or reenergization while operation is confined to the region between times O and A, it follows that in the case of larger errors that cause the transient to proceed past time A there will be some overshoot of the balance point because of insufficient gain reduction. If, on the other hand, the system is proportioned for optimum performance on large errors, more than one period of motor energization may be required to correct small errors. In most instances a satisfactory compromise is not difficult to effect. In any event the operation of the motor must move the slider of the controlled potentiometer and thus reduce the error before the motor will be deenergized once the starting transient has proceeded past time A.

When the motor is deenergized in anticipation of the arrival at the balance point, gain is largely restored, since even if the lamps are hot their resistance is much smaller than that of the potentiometer bridge. The inertia of the rotor of the relay is sufficient to prevent an immediate reclosing of contacts, and if the error is being further reduced by the rotation of the motor as it coasts the error signal tending to cause reclosing of the relay is also being diminished. When the error becomes quite small dynamic braking is applied, serving either to stop the motor at the desired balance point, or, if the motor speed is great enough that overshoot will inevitably occur, the period of dynamic braking will effect a considerable speed reduction that will reduce the extent of overshoot.

If the balance point is shifting continuously at a moderate rate it is desirable to have the motor follow smoothly. Under such conditions the relay may oscillate between the coast and energize positions, and the motor will run continually at reduced speed without great accelerations or decelerations. Each time the motor is energized gain will decrease so that deenergization will occur before the error is completely corrected. If the motor is running and generating back E.M.F., this opposes current inrush and the lamp heating rate will be less than for a start from rest. With the motor deenergized, a minimum error is sufficient to cause reenergization, which in this instance occurs with warm lamps or other non-linear resistance that also serves to limit the current inrush and prevent high accelerations. In the event the motor reaches the balance point the dynamic braking serves to slow it down, thereby avoiding the high reverse acceleration associated with reverse energization which would otherwise be caused if a sizable error in the opposite direction were permitted to develop.

In this mode of operation the slower cooling of the lamps at low temperatures due to greatly decreased radiation is significant, as this tends to maintain a series resistance in the motor circuit when running at reduced speed. The resulting combination of gain variation and automatic series resistance variation in the armature circuit results in an ability to follow smoothly a continuously changing balance point that is believed to be unique among relay servos. Fine adjustments of the instrumentality coupled to the motor may be made smoothly, an important factor if the invention described is used as a positioning device in or with another loop. The limited acceleration and higher deceleration, in combination with the aforementioned features, make it well suited for use in man-machine loops with the input potentiometer manually positioned.

Figure 5:
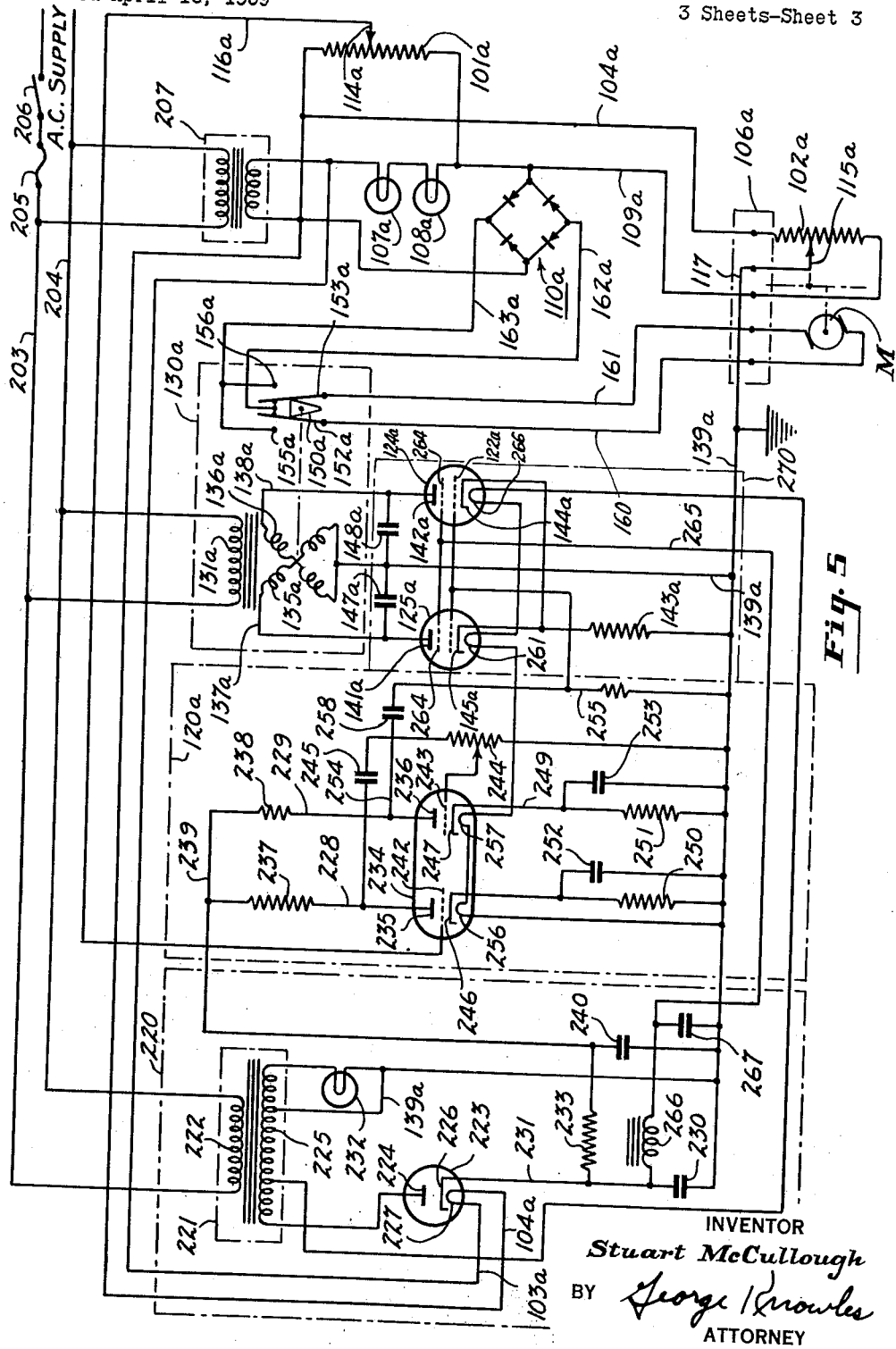
FIG. 5 is a diagram of a control circuit for a probe actuator showing greater detail than FIG. 1 and embodying the principles of the present invention.

In FIG. 5 is illustrated a more detailed circuit embodying the principles of the invention as it is applied to the control of a probe actuator such as is disclosed and claimed in U.S. Patent 2,637,842, it being understood that in this instance the permanent magnet shunt motor is used on the actuator. In FIG. 5 the parts corresponding to those described with reference to preceding figures are identified with numerals with the suffix "a".

The A.C. supply is connected to conductors 203 and 204, fuse 205 and switch 206 being in series. Relay exciter coil 131a is connected to leads 203 and 204. A transformer 207 supplies reduced voltage on leads 103a and 104a for the heater of rectifier tube 223, the motor, and the bridge circuit. The power supply section 220 is energized by connection of primary 222 of transformer 221 to the supply. Pilot light 232, heaters 256 and 257 of tube 234, heater 261 of tube 125a and heater 226 of tube 124a are energized by connection to secondary 255 of transformer 222. Plate 224 of rectifier tube 223 is also connected to secondary 225, rectified plate supply current being drawn from cathode 226 through lead 231. Filtering is accomplished by condensers 230, 240, and 267, choke 266, and resistor 233.

Voltage amplifier 120a uses a high-mu twin triode 234. Lead 116a conducts the signal from the input potentiometer slider 114a to grid 242 of the first amplifier triode. Resistor 250 and condenser 252 connected to cathode 246 and ground 139a provide bias. Lead 228 connects plate 235 to load resistance 237, and lead 239 connects these to the supply. Coupling condenser 245 connects to potentiometer 244, used for manual gain adjustment, and the slider of this potentiometer connects to grid 243 of the second triode amplifier. Resistor 251 and condenser 253 are connected to cathode 247 by lead 249 and to ground to provide bias. Plate 236 is connected by lead 229 to load resistor 238, which is in turn connected to the plate supply by lead 239. Coupling condenser 258 connects to plate 236 by lead 254 and to grid return resistance 259 and grids 122a and 123a of tubes 124a and 125a by lead 255, the other terminal of resistor 259 connecting to ground. Cathodes 144a and 145a connect to ground through bias resistor 143a. Screens 264 of beam power output tubes 124a and 125a are connected by lead 265 to the power supply. Plates 141a and 142a are connected by leads 137a and 138a to coils 135a and 136a of relay 130a and to condensers 147a and 148a, the common terminal of coils 135a and 136a and the other terminal of condensers 147a and 148a being connected to ground conductor 139a.

Motor armature M and potentiometer 102a with slider 115a are in this case part of the probe actuator assembly, connected to the control by cable 106a. The bridge, consisting of potentiometers 101a and 102a, is excited from transformer 207, being connected by leads 104a and 109a through lamps 107a and 108a in series. Slider 115a is connected by lead 117 to ground 139a. Rectifier 110a supplies D.C. power to relay contacts 154a, 155a, and 156a by leads 162a and 163a. The movable contacts mounted on springs 152a and 153a connect to the motor armature by leads 160 and 161.

Operation of this circuit is substantially the same as FIGURE 1. The power supply section 220 provides heater power, plate voltage, and screen voltage to the voltage amplifier and output state. A displacement of slider 115a of the potentiometer on the actuator relative to the input potentiometer causes a signal to be applied between the grid 242 and ground of the first amplifier stage. After appropriate conventional amplification by voltage amplifier 120a, the signal is applied to grids 122a and 123a of the output tubes, effecting a magnetic unbalance in the relay magnetic circuit and resultant torque appearing on toggle 150a of the relay 130a. If the contacts of the relay are thus operated, the motor will be energized through rectifier 110a and lamps 107a and 108a and operation of the motor will ensue in accordance with the discussion with reference to FIGURE 4.

The inventor claims:

1. In apparatus for moving a load to a desired position: a motor; an energization circuit for the motor; and a non-linear resistance device in the energization circuit for modifying the acceleration characteristics of the motor, the cold resistance of the resistor being sufficiently low compared to that of the stalled motor to permit the passage of a sufficient starting current to provide a large initial starting torque, said starting current heating the resistance rapidly thereby increasing the resistance of the resistor and thus limiting the voltage applied to the motor as well as the current drawn so as to reduce the subsequent acceleration of the motor below that which it would experience if the resistance of the resistor had not increased, the cooling characteristics of the resistor being such in relation to the motor and its load that, as the motor increases its speed and draws less current, the resistor is permitted to cool and its resistance to diminish so as to sustain a relatively small voltage drop across the resistor after the motor has fully accelerated.

2. The combination as set forth in claim 1, in which the resistor is substantially of the character of a tungsten incandescent lamp.

3. The combination as set forth in claim 1 together with means for detecting an error between the desired and the actual position of the load, and providing an error signal; and a switching device in said energization circuit and operated in response to said error signal, whereby a closed loop control system is provided.

4. In a control system for positioning a movable instrumentality to correct an error of departure from a desired condition: an element for sensing the error of said instrumentality, the error being the input to said element, said element having an output in the form of an electrical error signal indicative of such error, said signal increasing in magnitude with increasing error; an on-off controlling device; an actuator having an energization circuit dependent upon said on-off controlling device, and operative to move said instrumentality to effect a reduction of said error; circuit means operating said on-off controlling device in response to said error signal; and means automatically effecting, for a limited time commencing substantially when error correction action commences, progressive decrease in sensitivity or gain of that portion of said system serving to propagate the error or error signal from the error sensing element to the controlling device thereby relatively reducing the magnitude of the signal governing energization of the actuator, said reduction in magnitude of error signal being supplemental to reduction in such signal as may result from a reduction in position error caused by operation of the actuator, thereby varying the duration of the period during which actuator energization persists as a function of the magnitude of the error causing such energization despite a lag which may be present in that portion of the system embracing the controlling device, actuator, and instrumentality and may thus prevent the full effect of energizing the actuator from appearing immediately at said sensing element.

5. The combination of claim 4, in which the on-off power controlling device is a relay operated switch.

6. The combination of claim 4, in which the error sensing element is of such type that the error output signal is also a function of an applied excitation voltage or current, and the progressive decrease in sensitivity or gain is accomplished by means effecting an appropriate decrease in said excitation applied to the sensing element.

7. In a control system for an electrically operated positioning device: a reversible rotary electrical actuator, a first network for connection to a source of electrical power for energizing the actuator, said network including a switching device, an electrically actuated operator for the switching device, a bridge circuit having an output, a second network connecting the bridge circuit output to the operator, and means supplying excitation to said bridge circuit in accordance with the magnitude of electrical energization of said actuator.

8. In a control system for an electrically operated position device: a reversible rotary electrical actuator, a network providing a voltage for energizing said actuator, said network including a switch having contacts movable to one position for connecting the actuator in the network to operate in one direction and to another position for connecting the actuator to operate in a reverse direction, an electrically actuated operator for moving the switch contacts, means dependent upon the actuator energizing network for providing an alternating current voltage for the operator that is a function of the voltage available for energizing the actuator, said actuator energizing network including a non-linear resistance means connected to vary the voltage available to the actuator and applied to the operator.

9. In a control system using an electric motor to position a movable instrumentality, the combination therewith of: a control circuit governing the energization of the motor from a power source, said circuit including a rectifier and resistance means connected to the source, a motor network connected across the rectifier and including switch means for connecting the motor to the rectifier, sensing means for detecting a position error of the instrumentality, said sensing means being coupled to the switch means to govern the latter and thereby control the energization of the motor, said sensing means comprising an electrical network connected across the rectifier arranged and adapted to convert an error of position into a voltage signal, the magnitude of which varies directly in predetermined relation to the voltage across the rectifier, said resistance means being a non-linear resistance capable of substantial variation in resistance as a result of variation in motor current passing through it, whereby the resistance means and rectifier constitute a voltage divider connected in series across the source which automatically varies the voltage available to both motor and sensing networks.

10. In a control system for an electrically operated positioning device of the type having a reversible electrical actuator, a network for energizing the actuator, said network including non-linear resistance means arranged automatically to vary the voltage available to energize the actuator, said network also including switch means having contact means movable to one position for connecting the actuator in the network to operate in one direction and to another position for connecting the actuator to operate in a reverse direction, an electrical operator for moving the contact means, a network for controlling the operator, and a passive network interconnecting the control and actuator energizing networks so as to impress a variable voltage on the operator controlling network which at any instant is a function of the voltage available to energize the actuator.

11. In a motor control circuit for use in positioning a load moved by the motor, the combination of a non- linear resistance device and a switching device for connecting the motor, said switching device having at least four positions for various modes of connecting the motor for energization through said resistance, one position corresponding to motor rotation in one direction, another position corresponding to rotation in the opposite direction, another position corresponding to dynamic braking by the use of a circuit exclusive of resistance, and another position corresponding substantially to electrical disconnection of the motor so as to permit it to coast, said switching device thus providing various operational modes, namely, slowly accelerating the motor, quickly stopping it and permitting it to coast.

12. The method of controlling an electrical actuator which comprises dividing the electrical potential from the power source for energizing the actuator between such actuator and a stabilizing link, automatically increasing or decreasing the resistance of the stabilizing link upon increase or decrease respectively, of the current therein to effect a complemental decrease or increase, respectively in potential across the actuator, energizing the actuator in response to an alternating current signal derived from a primary error sensing element, deriving the excitation voltage for said primary element from the voltage available to the actuator whereby the strength of the signal varies with said voltage.

13. In a control system using a direct current motor to position a movable instrumentality: a primary error sensing element adapted to indicate by alternating current signal the deviation of the instrumentality from a desired position; a supply network for receiving alternating current power and for energizing said motor; said network including resistance means connected to diminish the voltage applied to the motor; a rectifier in the network to provide direct current for the motor; said resistance means being non-linear and subject to substantial change in resistance as a function of current through it; and means connecting said primary error sensing element in parallel relation to the rectifier to receive electrical energy, the voltage of which varies with that supplied for the motor whereby the magnitude of the signal corresponding to a given deviation of the instrumentality is varied in direct relation with said voltage.

14. The method of energizing and controlling an electrical actuator through companion networks from an electrical energy source of substantially constant voltage, which method comprises continuously dividing the constant supply voltage into complemental parts, continuously deriving a useful voltage from and in proportion to one of the complemental parts, continuously impressing the derived voltage on the energizing network of the actuator, varying the other of the complemental voltages continuously and automatically in response to the current in said actuator network, such varying of said other voltage being in the form of an increase upon an increase in the network current and in the form of a decrease upon a decrease in the network current, said increasing and decreasing variations of the other voltage being non-linear, continuously impressing the derived voltage on the control network of the actuator, utilizing the derived voltage to develop a signal indicative of a condition sensed by the controlling network, and governing the actuator automatically in response to the signal whereby the sensitivity of the controlling network is automatically varied to provide relatively high gain when relatively high useful voltage is applied to the actuator energizing network and vice versa.

15. A control system for positioning a load, said system comprising the following elements: a motor mechanically connected to the load so as to facilitate positioning it, an error detecting device to produce a signal indicative of a difference in the actual and desired position of the load, and an energizing circuit for the motor, said circuit including a switching device responsive to said error signal and movable through successive positions as a function of said error signal to effect forward energizing, forward coasting, dynamic braking, reverse coasting, and reverse energizing of said motor, and said energizing circuit also including a non-linear resistor for modifying the acceleration of the motor, the cold resistance of the resistor being relatively low to permit a substantial initial current flow sufficient to provide a large starting torque, said initial current heating the resistor rapidly and thereby increasing its resistance and thus limiting the current drawn by the motor and the voltage applied to the motor so as to reduce the acceleration of the motor below that which it would experience if the resistance of the resistor had not increased, the cooling characteristics of the resistor being such that as the motor increases speed and draws less current the resistor cools and its resistance diminishes so as to sustain a relatively small voltage drop across the resistor after the motor has fully accelerated.

16. A control system comprising the following elements: a motor mechanically connected to a load so as to facilitate positioning it, an error detecting device to produce a signal indicative of the difference in the actual and desired position of said load, and an energizing circuit for said motor, said circuit including an electromagnetic actuator responsive to said error signal and having a stator, rotor, exciter coil, and signal coils, a switching device connected to said electromagnetic actuator and movable in response thereto to effect forward energizing, reverse energizing, coasting, and dynamic braking of the motor in response to said error signal, and a non-linear resistor for modifying the acceleration of the motor by presenting a low resistance to the initial starting current of the motor, presenting an increased resistance while the motor accelerates due to heating by the current drawn by the motor, and when the motor is fully accelerated and draws less current, thus permitting the resistor to cool, presents a resistance diminished from the increased value.

References Cited in the file of this patent

UNITED STATES PATENTS

| | | |
|---|---|---|
| 806,758 | Steinmetz | Dec. 5, 1905 |
| 1,299,965 | Leake | Apr. 8, 1919 |
| 1,711,285 | Petersen | Apr. 30, 1929 |
| 1,814,810 | Jump | July 14, 1931 |
| 2,047,228 | Rypinski | July 14, 1936 |
| 2,385,481 | Wills | Sept. 25, 1945 |
| 2,426,508 | Isserstedt | Aug. 26, 1947 |
| 2,455,364 | Hays | Dec. 7, 1948 |
| 2,489,689 | Wald | Nov. 29, 1949 |
| 2,534,801 | Siltamaki | Dec. 19, 1950 |
| 2,753,499 | Dion | July 3, 1956 |
| 2,886,755 | Ehret et al. | May 12, 1959 |